April 14, 1970   A. F. GAWRON ET AL   3,506,898
STATOR CONSTRUCTION INCLUDING AN ENCAPSULATED SEMI-CONDUCTOR
DEVICE MOUNTED ON THE STATOR
Filed Nov. 7, 1966                         2 Sheets-Sheet 2
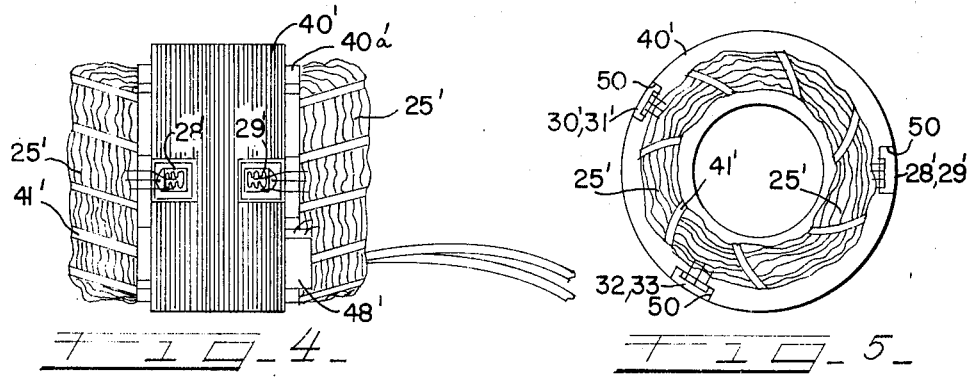
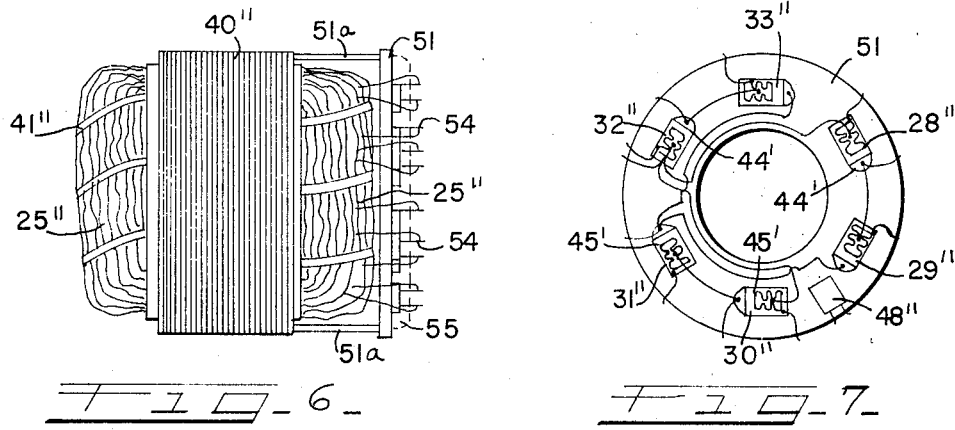
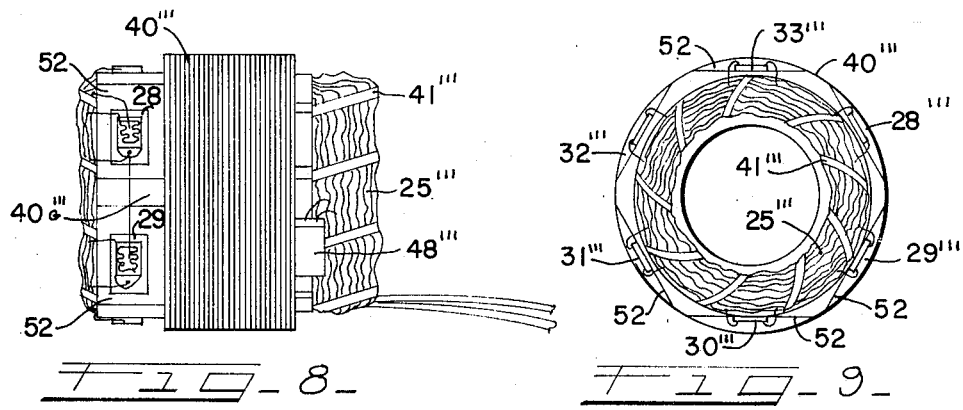
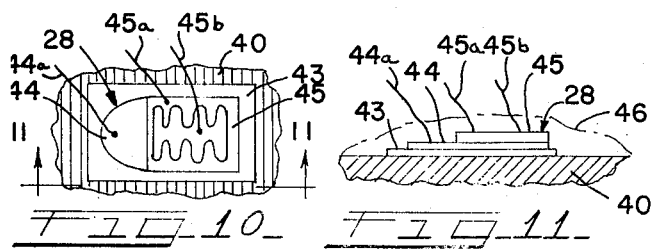
INVENTOR.
ALEX F. GAWRON
FRANK C. SCHRACK
BY
ATT'YS.

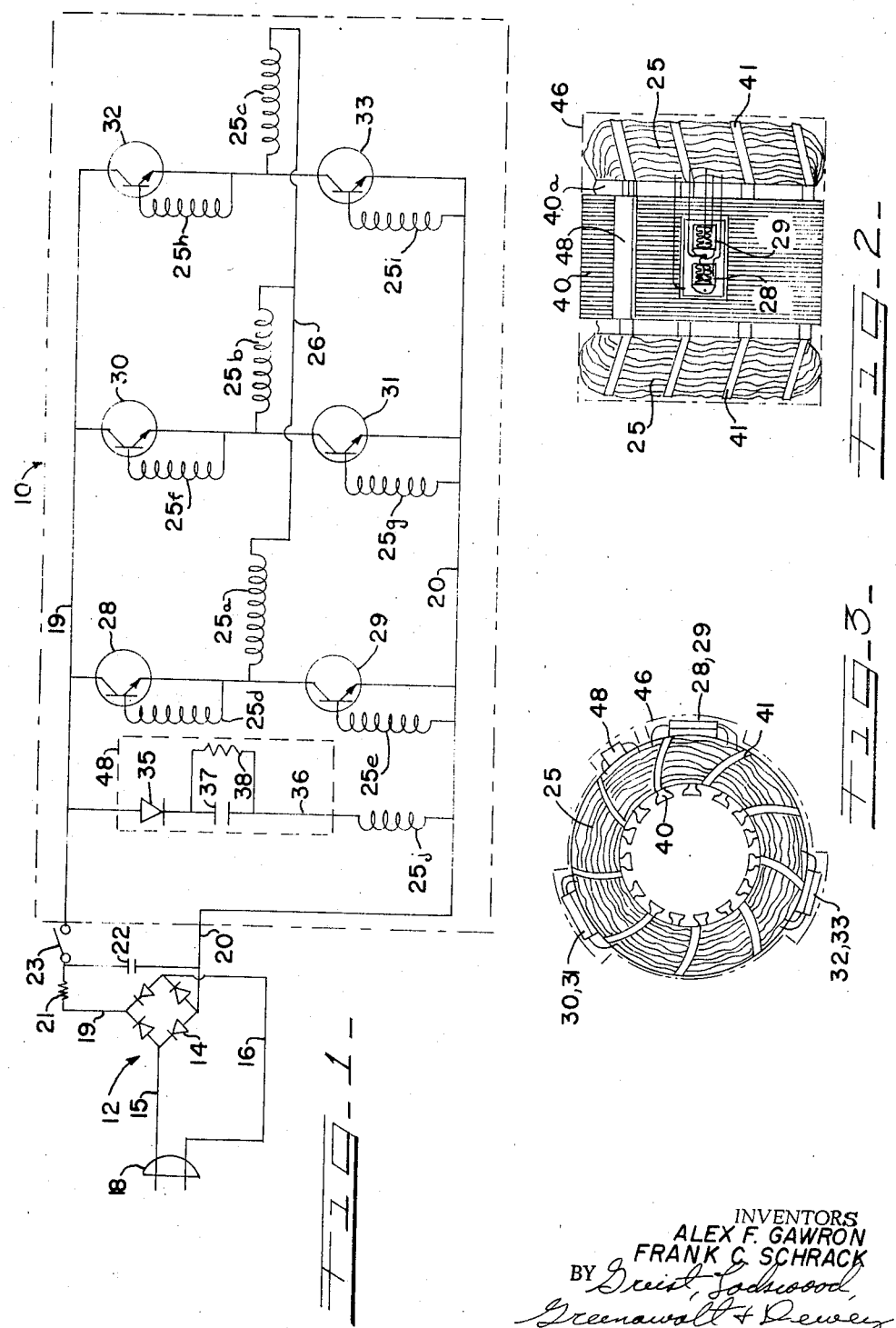

United States Patent Office 3,506,898
Patented Apr. 14, 1970

3,506,898
STATOR CONSTRUCTION INCLUDING AN ENCAPSULATED SEMI-CONDUCTOR DEVICE MOUNTED ON THE STATOR
Alex F. Gawron and Frank C. Schrack, Chicago, Ill., assignors to Skil Corporation, Chicago, Ill., a corporation of Delaware
Filed Nov. 7, 1966, Ser. No. 592,624
Int. Cl. H02p 29/00
U.S. Cl. 318—138    12 Claims

ABSTRACT OF THE DISCLOSURE

The motor stator has a built-in or integral frequency generator which includes a plurality of transistors. Each transistor is mounted directly to the motor stator. Each transistor is defined by a sheet of insulating material mounted to the stator structure, a collector or terminal plate and a transistor chip or semi-conducting body mounted on the collector plate; these members are covered by an encapsulating compound the outer surface of which is exposed.

---

The present invention relates in a general way to an alternating current motor of the type having an electronic switching circuit for converting a direct current source of energy into alternating current in the stator windings, and more particularly the present invention has to do with new and improved means for mounting the electronic components of such a circuit.

In copending Gawron application, Ser. No. 566,101, filed July 18, 1966, there is disclosed and claimed a frequency generator associated with a motor stator of the induction type. In essence, the frequency generator consists of a plurality of pairs of transistors arranged in push-pull relation and associated with a saturable core transformer for converting a direct current input into multi-phase, alternating current in the stator windings of the multi-phase, alternating current motor. The various transformer coils or windings are wound on the stator of the motor in inductive relation with the stator windings; therefore certain of the stator windings actually serve as the transformer windings, and a portion of the stator core serves as the transformer core. The present invention has to do with mounting the semi-conducting body of each transistor on the stator in fixed relation therewith and therefore the invention has particular applicability with the aforementioned Gawron frequency generator to provide a motor of the type described as a unitary structure and obviating a separate power package.

A primary object of the present invention is the provision of a stator having an associated circuit including at least one switching device of the type consisting of a body of semi-conducting material, wherein such body is mounted on the stator in fixed relation therewith.

Another object of the present invention is the provision of an alternating current motor including an electronic circuit for converting direct current to alternating current in the stator, which circuit includes a switching device of the type consisting of a body of semi-conducting material, such body being mounted on the stator in fixed relation therewith and also being enclosed in an encapsulating compound.

Still another object of the present invention is the provision of a power system or motor including an induction-type motor and associated frequency generator, which frequency generator includes pairs of solid state switches arranged in push-pull relation and associated with a saturable core transformer defined by a portion of the stator and by certain of the stator windings, such switches including bodies of semi-conducting material, such as silicon, mounted on the stator in fixed relation therewith, thereby forming a power system or motor of unitary construction and obviating a separate power package.

Another object of the present invention is the provision of a power system or motor according to the foregoing object wherein such motor includes a starting circuit, the components of the starting circuit also being mounted on the stator and associated with starting windings which are formed by one or more of the stator windings.

These and other objects and advantages of the invention will become apparent from the following specification disclosing a preferred embodiment of the invention in the accompanying drawings wherein:

FIG. 1 is a circuit diagram showing a frequency generator and associated stator windings with which the present invention has particular applicability;

FIG. 2 is a plan view of a stator showing one embodiment of the present invention;

FIG. 3 is an end view of the FIG. 2 embodiment;

FIG. 4 is a plan view of a stator showing another embodiment of the invention;

FIG. 5 is an end view of the FIG. 4 embodiment as seen from the left end thereof;

FIG. 6 is a plan view of a stator showing still another embodiment of the present invention;

FIG. 7 is an end view of the FIG. 6 embodiment;

FIG. 8 is a plan view of a stator showing another embodiment of the present invention;

FIG. 9 is an end view of the FIG. 8 embodiment as seen from the left end thereof;

FIG. 10 is an enlarged plan view of a typical semi-conductor mounting or installation according to the present invention; and FIG. 11 is a section taken along the line 11—11 of FIG. 10.

The motor or power system diagrammatically illustrated in FIG. 1 will first be explained. This motor, the circuit of which forms no part of the present invention, is generally designated 10 and shown within the phantom lines of FIG. 1. The motor or power system essentially includes the stator coils of an induction-type motor and an associated frequency generator. The frequency generator converts direct current to multi-phase, high frequency alternating current in the stator windings thereby to drive the armature (not shown) of the motor. The frequency generator is preferably associated with rectifying means, generally designated 12, thereby to adapt the power system for energization from conventional alternating current, i.e., so-called line or house current.

The rectifying means 12 will be seen to include a full-wave bridge rectifier including four diodes 14 connected across lines 15 and 16 which extend to a conventional plug 18 for connection with single phase line current, which in the United States is in the order of 117 volts at 60 cycles per second. Extending from the bridge rectifier are direct current lines 19 and 20, the former being positive and the latter being negative. A resistor 21 is connected in line 19 and a capacitor 22 is connected across lines 19, 20 in parallel with the bridge rectifier. It will be apparent that the rectifying means 12 changes line alternating current to direct current in the lines 19, 20. The capacitor 22 acts to reduce the ripple or voltage fluctuations of the direct current, which ripple results from rectifying the alternating current in the lines 15, 16 by the full-wave bridge. It will be understood that the values of the resistor 19 and capacitor 22 can be changed as necessary to accommodate input voltage different from 117 volts, which might be encountered in foreign countries. It will also be understood that the lines 15, 16 may be connected to a direct current source in which case direct current will of course still be supplied to the lines 19, 20. Numeral 23 represents an on-off or control switch in the line 19.

The sets of stator windings of a three phase, induction-type motor are designated 25a, 25b and 25c in FIG. 1, which windings are connected to a common line 26. The frequency generator converts direct current in the lines 19, 20 to a multi-phase, high frequency alternating current in the stator windings 25a, 25b and 25c.

The frequency generator includes a first pair of transistors 28, 29 connected in push-pull across the lines 19, 20 and to the stator winding 25a. These transistors are alternately biased into conducting and non-conducting states by means of a saturable core transformer including windings 25d and 25e. It will be understood that certain of the motor stator windings constitute the transformer windings 25d and 25e. In other words, the transformer for controlling the transistors 28 and 29 is defined by certain of the stator windings and by a portion of the core thereof.

The next phase of the frequency generator is defined by a pair of transistors 30, 31 connected in push-pull across the lines 19 and 20 and to the stator winding 25b. These two transistors are alternately biased into conducting and non-conducting states by transformer windings 25f and 25g which are also wound on the stator.

The last phase of the generator includes transistors 32, 33, connected in push-pull across the lines 19, 20 and to the stator winding 25c. These transistors are controlled by secondary windings 25h and 25i which are also defined by certain of the stator windings.

The frequency generator includes a starting circuit consisting of a diode 35 connected in a line 36 extending across the lines 19, 20. The line 36 is in series circuit relation with a winding 25j defined by one of the stator windings. A capacitor 37 and resistor 38 are mounted in parallel relation with each other and connected in the line 36.

It will be understood that the various transformer windings 25d–25i serve to switch or bias the associated transistors from their conducting and non-conducting conditions to establish a three phase, high frequency, alternating current in the stator windings 25a–25c so as to operate the induction-type motor. For a more detailed explanation of the construction and operation of the aforementioned motor or power system, reference should be had to the Gawron application identified above.

The present invention has to do with mounting the various transistors or semi-conductor switching devices directly on the motor stator. As it will become apparent from the following description, such construction provides for a motor of the type described to be a unitary construction and thereby obviates a separate power package. The resulting motor or power system is extremely compact and well suited for installation where size and weight considerations are critical, as in portable power tools, for example.

Referring now to the embodiment of the invention illustrated in FIGS. 2 and 3, the stator 40 is formed of the usual laminated construction, and includes a core member 40a. The windings 25 are wound on the stator 40 and secured thereon by means of a plurality of bands 41. As best noted in FIG. 2, a pair of the transistors, such as the transistors 28, 29 are mounted directly on the stator 40. The other transistors are mounted in pairs circumferentially of the stator as noted in FIG. 3.

At this time it should be mentioned that most transistors in use at the present time include a metallic housing, usually cylindrical in form and enclosed at both ends thereof, having three terminals projecting therefrom and also having suitable means adapting the transistor housing for mounting. The housing contains the body of semiconducting material, such as silicon. The transistor is usually of the junction type, and therefore the semi-conducting body includes three distinct layers having the terminals respectively connected thereto. The junction type transistor may of course be either of the NPN or PNP type. The present invention does not employ transistors according to the aforementioned construction. Rather, the present invention employs transistors without a housing or other enclosing member. In other words, the present invention has to do with mounting the semi-conducting body itself directly onto the stator in insulated relation therewith.

FIGS. 10 and 11 show a typical transistor mounting or installation according to the present invention. By way of example, the transistor 28 is shown in these two figures. A sheet of insulating material 43 is suitable mounted to the laminated members of the stator 40. Mounted on this insulating sheet is the collector terminal or plate 44 having a lead or conductor 44a extending therefrom. The transistor chip or semi-conducting body 45, usually formed of silicon, is mounted on the collector terminal 44, the former including base and emitter leads or conductors 45a, 45b. In this arrangement, the stator 40 itself acts as the heat sink for the transistor. The entire transistor is preferably enclosed in an encapsulating compound represented in FIG. 11 by the phantom line 46. Of course, the entire stator may be closed in such encapsulating compound as indicated by the phantom lines 46 in FIGS. 2 and 3.

Returning now to these two figures, it will be understood that all of the transistors are directly mounted onto the stator in the manner illustrated in FIGS. 10 and 11. The various terminals or leads of each transistor extend directly to the appropriate stator windings and are preferably enclosed in the encapsulating compound referred to above. The components of the starting circuit shown in FIG. 1 may also be mounted on the stator on an insulated sheet (not shown) similar to the insulating sheet 43. The various components of the starting circuit, which are shown within the broken line designated 48 in FIG. 1, are designated by the same numeral in FIG. 3 and are shown mounted on the stator. Thus, the present invention provides as a unitary structure a motor of the type described above.

Another embodiment of the invention is shown in FIGS. 4 and 5. The parts of this embodiment, as well as the other embodiments to be described herein, which correspond to the embodiment shown in FIGS. 2 and 3 are indicated by the prime form of numeral. The FIGS. 4 and 5 embodiment is quite similar to the aforedescribed embodiment, except in the former the transistors are mounted in cutout portions or cavities formed in the laminated stator 40', thereby contributing even more to compact construction. These cutouts or cavities are designated by the numeral 50 and are best shown in FIG. 5. It will be understood that the mounting arrangement for the transistors is virtually the same as that shown in FIGS. 10 and 11. In the FIGS. 4 and 5 embodiment, the various components of the starting circuit are contained in a unit 48' which is mounted adjacent one end of the laminated members forming the stator 40'. The starting circuit unit 48' may be partially secured to one of the end laminations of the stator 40' and to the stator core member 40a'.

In the FIGS. 6 and 7 embodiment, the various transistors are mounted in circumferential spaced relation on an annular plate 51 supported adjacent one of the ends of the stator 40" by a plurality of circumferentially spaced, axially extending members 51a. Again, the mounting of the individual transistors is essentially the same as that depicted in FIGS. 10 and 11; however, there are important differences which will be explained hereinbelow. The starting circuit unit 48" may be mounted at any convenient location on the plate 51. It will be apparent that the FIGS. 6 and 7 embodiment provides for a motor of the type described which is of unitary and extremely compact construction.

In the FIGS. 8 and 9 embodiment, the core member

40a''' extends from the laminated stator portion 40''' a substantial distance adjacent one end of the latter and is formed in more or less hexagonal form by flat surfaces 52 mounting respective transistors. It will be understood that the mounting for the individual transistors in the FIGS. 8 and 9 embodiment may be the same as that shown in FIGS. 10 and 11. The starting circuit unit 48''' is directly mounted to the stator as by securing the same adjacent one of the end laminations of the stator portion 40'''. It will be appreciated that the embodiment of the invention shown in FIGS. 8 and 9 provides for an extremely compact motor of unitary construction.

Referring back to FIGURES 6 and 7, the annular plate 51 is formed of suitable dielectric material, such as alumina, for example. The outside face of the plate 51 is provided with six separate metallized layers or areas which form the collectors 44' of the transistors. The transistor chips or bodies of semi-conducting material 45' are suitably mounted on respective layers or collectors 44'. Three pins or posts 54 are connected respectively to the collector, base and emitter of each transistor. The transistors, i.e., both the collector layer and body of semi-conducting material, and the adjoining ends of the posts 54 are covered by an encapsulating compound 55 leaving only the outer ends of the posts 54 exposed. Suitable wires or conductors connect the outer or exposed ends of the posts 54 with the various stator windings. After this has been done, the entire motor stator may be enclosed within an encapsulating compound, such as represented by 46 in the embodiment of FIGURES 2 and 3.

The formation defined by the insulating compound 55 acts to brace the posts 54 and hold the same in place for affixation of the various conductors extending to the stator windings. It will be apparent that the construction shown in FIGURES 6 and 7 provides a unique and simple way to form a switching device, such as a transistor, and also to mount a plurality of such switching devices in insulated and spaced relation.

It will be understood that the various forms of stators shown in FIGS. 4, 5, and 8, 9 may be entirely enclosed within an encapsulating compound as described above in connection with the embodiment of the invention shown in FIGS. 2 and 3. It will also be understood that the invention is not to be limited to the particular circuit or multiphase motor illustrated in FIG. 1. The present invention may be embodied in any motor consisting of a stator and an associated electronic switching circuit having at least one switching device which includes a body of semi-conducting material of the type described herein.

While the invention has been illustrated in only several forms, it is not to be so limited. On the contrary, the invention is susceptible of various forms and modifications without departing from the spirit and scope of the appended claims.

We claim:

1. In a multi-phase motor-stator of the type having a multi-phase frequency generator therefor, said stator having fixed windings thereon including a first set of windings defining respective motor phases, said frequency generator being adapted to be connected to a source of direct current and to said first set of windings to effect in the latter a multi-phase, high frequency alternating current, said frequency generator including a plurality of legs each leg being connected across the direct current source, each of said legs consisting of a pair of solid state switch devices arranged in push-pull relation, said sets of stator windings being connected to respective frequency generator legs, saturable core transformer means having a plurality of phases equal in number to the number of legs, each phase of said transformer means having a pair of secondary winding means respectively connected with the pair of switch devices in the associated frequency generator leg for alternately biasing such switch devices into conducting and nonconducting conditions in response to flux change in each phase of the transformer means, said fixed windings of the stator including a second set of windings defining the pairs of secondary winding means, the pairs of secondary winding means thereby being magnetically coupled with each other for synchronizing and spacing the phases of alternating current at the frequency generator output, the improvement comprising, each of said switch devices being mounted on said stator in fixed relation therewith and solely comprising a body of semi-conducting material having at least three terminals connected therewith.

2. The improvement according to claim 1 wherein each body comprises a material having junctions defined by three distinct regions.

3. The improvement according to claim 1 wherein each of said switch devices comprises a transistor.

4. The improvement according to claim 1 further defined by a starting circuit including one or more of said fixed stator windings, said starting circuit also including one or more electrical components, which components are mounted on said motor stator in fixed relation therewith.

5. In a multi-phase motor-stator of the type having a multi-phase frequency generator therefor, said stator having fixed windings thereon including a first set of windings defining respective motor phases, said frequency generator being adapted to be connected to a source of direct current and to said first set of windings to effect in the latter a multi-phase, high frequency alternating current, said frequency generator including a plurality of legs each leg being connected across the direct current source, each of said legs consisting of a pair of solid state switch devices arranged in push-pull relation, said sets of stator windings being connected to respective frequency generator legs, saturable core transformer means having a plurality of phases equal in number to the number of legs, each phase of said transformer means having a pair of secondary winding means respectively connected with the pair of switch devices in the associated frequency generator leg for alternately biasing such switch devices into conducting and non-conducting conditions in response to flux change in each phase of the transformer means, a second set of windings defining the pairs of secondary winding means, the pairs of secondary winding means being magnetically coupled with each other for synchronizing and spacing the phases of alternating current at the frequency generator output, the improvement comprising, each of said switch devices including at least one body of semi-conducting material, said body being mounted on said stator in fixed insulated relation therewith, and an encapsulating compound in direct physical contact with said body and enclosing the same and at least an adjacent portion of the stator.

6. The improvement according to claim 5 further defined by, a member fixedly secured to said stator and formed of dielectric material, which member includes a plurality of generally planar surface areas, a plurality of separate metallized layers mounted on said surface areas respectively, a plurality of separate semi-conducting bodies mounted on respective layers, each of said layers and the body mounted thereon comprising one of said switch devices, and conductors connecting said switch devices in a circuit with said fixed windings.

7. The improvement according to claim 6 wherein at least one post is connected to each of said layers and to each of said bodies, which posts are formed of conducting material and extend in generally perpendicular relation with the associated surface areas, a formation of an encapsulating compound enclosing all of said layers, bodies and the inner ends of said posts, said conductors being connected to the outer ends of said posts.

8. The improvement according to claim 6 wherein said member comprises an annular plate mounted in concentric relation with said stator.

9. The improvement according to claim 5 further defined by, a starting circuit including one or more of said fixed stator windings, said starting circuit also including one or more electrical components, which components are mounted on said stator in fixed relation therewith.

10. The improvement according to claim 5 further defined by, each of said switch devices being comprised by a body of semi-conducting material having at least three terminals.

11. The improvement according to claim 10 wherein each body comprises a material having junctions defined by three distinct regions.

12. The improvement according to claim 5 wherein said switching means comprises one or more transistors.

References Cited

UNITED STATES PATENTS

| | | | |
|---|---|---|---|
| 3,098,958 | 7/1963 | Katz | 318—138 |
| 3,225,232 | 12/1965 | Turley et al. | 310—50 XR |
| 3,250,929 | 5/1966 | Maier | 310—68 |
| 3,271,601 | 9/1966 | Raver | 310—68 |
| 3,341,724 | 9/1967 | Saslow et al. | 318—254 XR |
| 3,353,078 | 11/1967 | Maynard | 310—68 XR |
| 3,356,873 | 12/1967 | Tamm | 310—68 |
| 3,386,019 | 5/1968 | Hill | 318—138 |

G. R. SIMMONS, Primary Examiner

U.S. Cl. X.R.

310—43, 45, 48